(12) United States Patent
Brown et al.

(10) Patent No.: US 6,401,238 B1
(45) Date of Patent: Jun. 4, 2002

(54) INTELLIGENT DEPLOYMENT OF APPLICATIONS TO PRESERVE NETWORK BANDWIDTH

(75) Inventors: Michael Wayne Brown, Georgetown; Joseph H. McIntyre; Scott L. Winters, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/210,202

(22) Filed: Dec. 10, 1998

(51) Int. Cl.[7] .............................................. G06F 9/445
(52) U.S. Cl. ......................................... 717/11; 709/224
(58) Field of Search ............... 717/11, 4; 709/216–223, 709/229, 224, 225, 226

(56) References Cited

U.S. PATENT DOCUMENTS

| | | | | |
|---|---|---|---|---|
| 5,960,204 A | * | 9/1999 | Yinger et al. | 395/712 |
| 5,999,741 A | * | 12/1999 | May et al. | 395/712 |
| 6,056,786 A | * | 5/2000 | Rivera et al. | 795/712 |
| 6,073,214 A | * | 6/2000 | Fawcett | 711/133 |
| 6,074,434 A | * | 6/2000 | Cole et al. | 717/11 |
| 6,105,069 A | * | 8/2000 | Franklin et al. | 709/229 |
| 6,117,188 A | * | 9/2000 | Aronberg et al. | 717/11 |

* cited by examiner

*Primary Examiner*—Kakali Chaki
(74) *Attorney, Agent, or Firm*—Jeffrey S. LaBaw; Joseph R. Burwell; David Judson

(57) ABSTRACT

A method for deploying an application to client computers across a computer network is operative in a server environment in which given conditions, such as network load and actual or relative time-of-day, are being monitored. The method begins by establishing at least one rule for determining which of a given set of application versions are to be served to a client computer, and by establishing at least one user profile for determining which of a given set of users have a given priority. In response to a request from a client computer to serve the application, the rule is resolved against the monitored conditions and the user profile to select an application version to serve to the client computer. The application version is then served to the client computer.

26 Claims, 3 Drawing Sheets

|  | HIGH | NORMAL | LOW |
|---|---|---|---|
| MONDAY | 8:15-9:15, 12:50-1:15 | 9:15-12:10, 1:15-4:45 | mid-8:15, 12:10-12:50, 4:45-mid |
| TUESDAY | 8:00-9:10, 12:50-1:15 | 9:10-12:10, 1:15-4:45 | mid-8:00, 12:10-12:50, 4:45-mid |
| WEDNESDAY | 8:00-9:10, 12:50-1:15 | 9:10-12:10, 1:15-4:45 | mid-8:00, 12:10-12:50, 4:45-mid |
| THURSDAY | 8:00-9:10, 12:50-1:15 | 9:10-12:10, 1:15-4:45 | mid-8:00, 12:10-12:50, 4:45-mid |
| FRIDAY | 8:00-9:10, 12:50-1:15 | 9:10-12:10, 1:15-4:45 | mid-8:00, 12:10-12:50, 4:45-mid |
| SATURDAY |  |  |  |
| SUNDAY |  |  |  |

*FIG. 4*

| APPLICATION | RULE CRITERIA | POINTER |
|---|---|---|
| PA | HIGH PERFORMANCE | 1 |
| PA | LOW BANDWIDTH AVAILABILITY FINANCE DEPARTMENT | 2 |
| PA | LOW BANDWIDTH AVAILABILITY | 3 |

*FIG. 5*

INTELLIGENT DEPLOYMENT OF APPLICATIONS TO PRESERVE NETWORK BANDWIDTH

BACKGROUND OF THE INVENTION

1. Technical Field

The present invention relates generally to intelligent distribution of software applications in a computer network enterprise environment.

2. Description of the Related Art

It is well-known to connect a set of computers into a computer network to enable users to share applications and resources. A problem arises, however, when multiple users require copies of a given application at the same time, as is typically the case when employees arrive to work at the same time and boot their computers. When this occurs, network utilization promptly reaches a maximum, thus significantly degrading performance. Network bandwidth issues thus are a significant barrier to widespread, efficient deployment of network computing applications.

There have been attempts to solve this bandwidth utilization problem. One approach is to lower network traffic by creating theoretically smaller, yet more optimized applications. This technique is costly and is not always practical. Another approach is to prioritize deployment of a given application to given users. This approach has the obvious disadvantage in that certain users are unable to obtain the application (despite need) until others have received their copies first. Neither approach adequately addresses the bandwidth issue while at the same time preserving the ability of a given user to obtain a copy of a given application when he or she requires that copy.

This problem is addressed by the present invention.

BRIEF SUMMARY OF THE INVENTION

It is an object of the present invention to deploy applications across a network in a manner that conserves bandwidth.

It is a more specific object of this invention to intelligent deploy a given version of an application to given machines in a network based on sets of criteria defined by an administrator to reflect user needs and a current network environment.

A more general object of this invention is to provide a mechanism for controlling the use of network bandwidth through intelligent selection of applications, or application modules, to ensure that the bandwidth is used according to priorities of the network administrator.

It is another object of this invention to intelligently deploy applications, or application modules, to ensure that network bandwidth is used according to administrator-configured priorities.

It is an object of this invention to use information available to a file server to control the server to deliver different representations of the same application, or to assemble application modules dynamically, to minimize network bandwidth utilization.

According to the invention, a server supports multiple versions of its applications, with each version tuned for differing criteria. A small size version may be selected during times of high network usage to minimize congestion, whereas a high performance, though larger, version may be selected during lower traffic conditions. The server may dynamically create the applications to download, selecting modules for the application based on sets of criteria defined by the server administrator to reflect the user needs and current network environment. When a given user receives a lower performance (or lower function) version, the inventive routine may selectively serve a higher performance (or higher function) version as the monitored conditions (namely, time-of-day, network characteristics, etc.) change.

According to a preferred embodiment, a method is provided for deploying an application to client computers across a computer network. The method is operative in a server environment in which given conditions, such as network load and actual or relative time-of-day, are being monitored. The method begins by establishing at least one rule for determining which of a given set of application versions are to be served to a client computer, and by establishing at least one user profile for determining which of a given set of users have a given priority. In response to a request from a client computer to serve the application, the rule is resolved against the monitored conditions and the user profile to select a first application version to serve to the client computer. The first application version is then served to the client computer. Later, a second application version may be selectively served to the client computer as monitored conditions change.

In one embodiment, the first application version has a higher performance metric than the second application version. Alternatively, the first application version has a larger function set as compared to the second application version.

As noted above, the monitored conditions generally include at least one network characteristic. Representative characteristics include, for example, current bandwidth utilization over a given period of time, elapsed time for transfer of a given number of bytes, a prediction of elapsed time to send a given number of bytes based on historical data, network response time for packet delivery, effective transfer rate, event occurrence rate, and network usage ratio to disk and CPU usage.

In accordance with an alternate embodiment, the method assigns a given user a priority value that determines the user's priority for obtaining a given version of an application. In response to a request to serve the application to a client computer, the routine selects a version of the application based on the priority value and/or a given monitored characteristic of the network, for example, network load. The selected version of the application is then served to the client computer.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 4 is a table illustrating a representative time-of-day monitor; and

FIG. 5 is a table illustrating a representative application version set according to the present invention.

DETAILED DESCRIPTION OF THE PREFERRED EMBODIMENT

Figure 1:
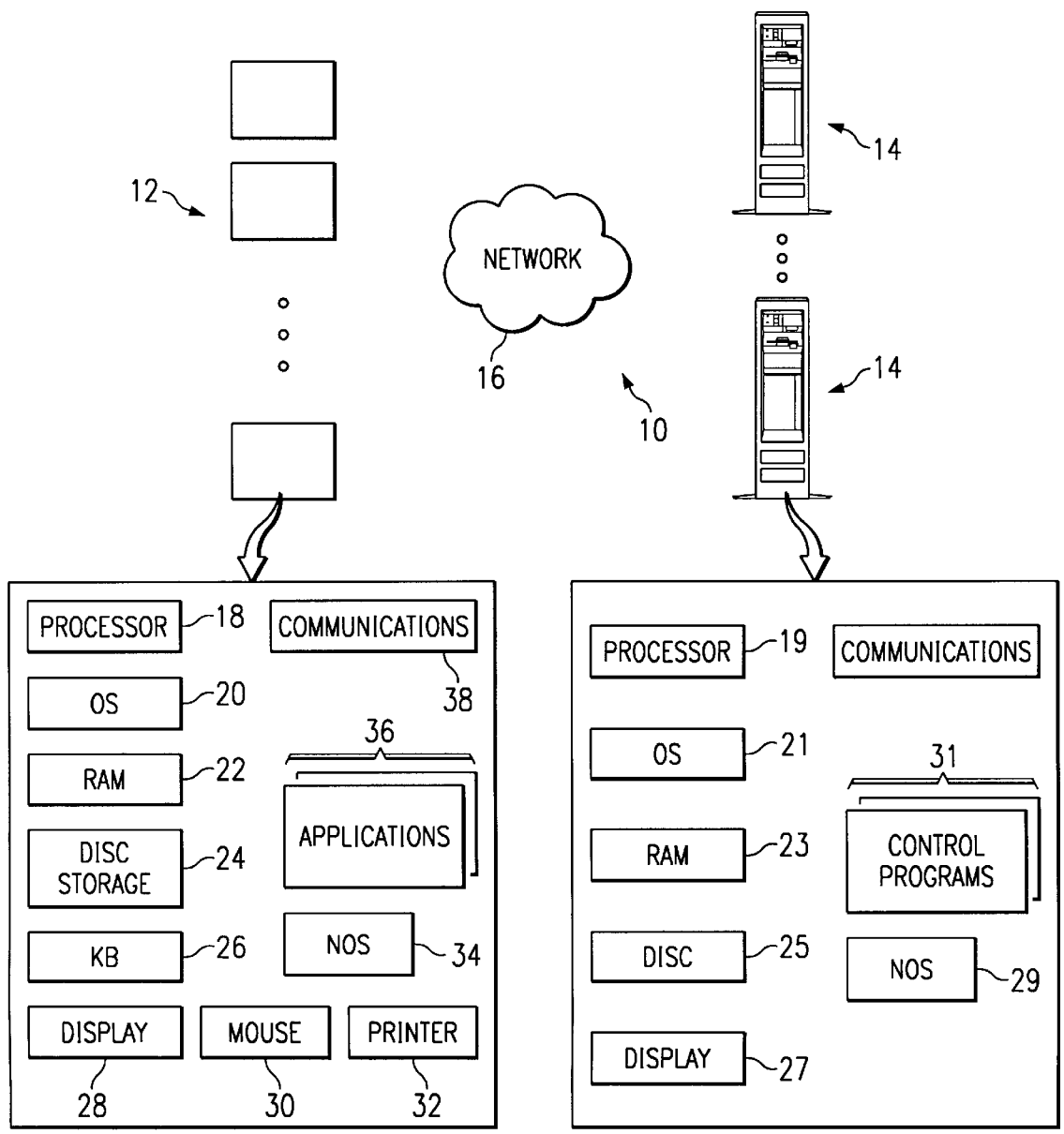
FIG. 1 is a representative system in which the present invention is implemented.

A representative system in which the present invention is implemented is illustrated in FIG. 1. A representative computer system 10 in which the present invention is implemented comprises one or more client machines 12 connected to one or more servers 14 across a computer network 16. Although not a limitation, the present invention is preferably implemented in a computer enterprise environment in which there are a controlled set of users that can be managed, as well as a controlled set of applications to be deployed with the environment. The particular applications may be written in Java, C, C++, or in any other programming language.

A representative client is a computer that includes an x86-, PowerPC®- or RISC-based processor 18, an operating system 20 such as IBM® OS/2® or Microsoft Windows '95, RAM storage 22, disk storage 24, input/output devices (e.g., a keyboard 26, display 28, mouse 30, printer 32, etc.), a network operating system (NOS) 34, various application programs 36, communications devices 38, and other known hardware, software, and the like. A representative server, typically configured as a file server, likewise includes an x86-, PowerPC®- or RISC-based processor 19, an operating system 21 such as IBM® OS/2®, Microsoft Windows NT or UNIX, RAM 23, disk storage 25, a display 27 having a graphical user interface (GUI) for enabling an administrator to interface to the server, a network operating system (NOS) 29, and various control programs 31.

The present invention is conveniently implemented in a server computer network operating system (NOS) or as an extension thereof. The functionality may be provided by a standalone program as well. Representative network operating systems in which the present invention may be implemented include, without limitation, IBM Warp Server on OS/2, Microsoft NT Server on Windows NT, any NOS supported on UNIX, and the like.

Figure 2:
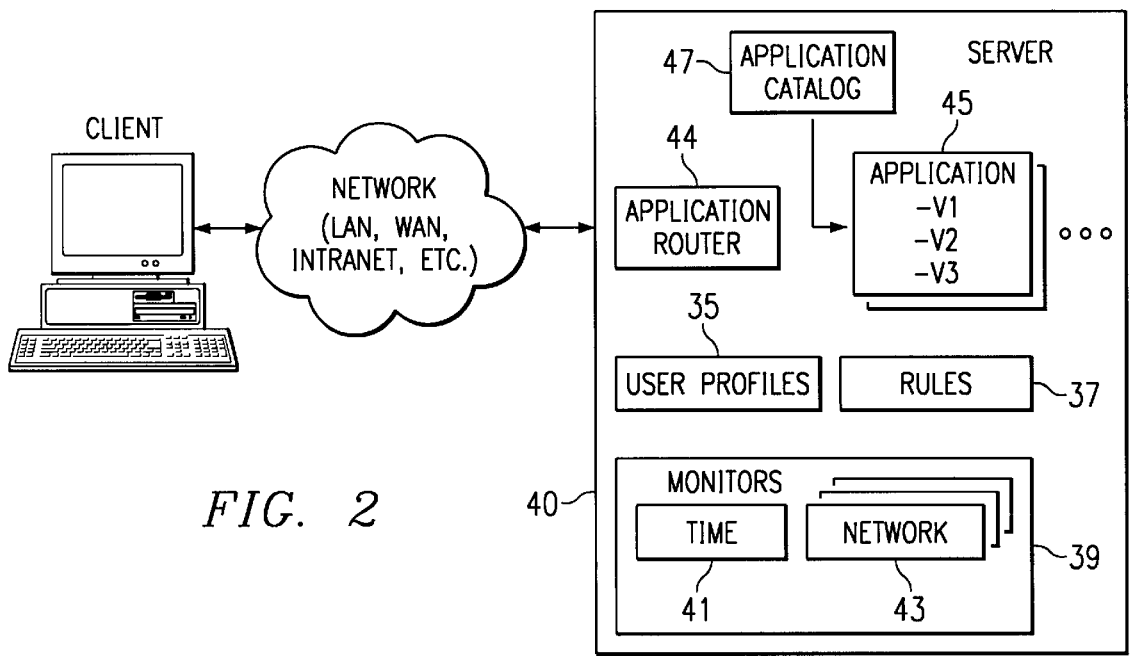
FIG. 2 is a block diagram of the components of the present invention.

With reference now to FIG. 2, the present invention preferably is implemented in an application router 44 that is integrated into or operates as an extension of an existing network operating system 40 running on a server in the computer network. Preferably, each server that provides the inventive functionality has an instance of the application router 44. Generally, application router 44 functions to serve (to given client machines) one of a given set of versions of the same software application depending on inputs provided from a set of user profiles 35, a set of rules 37, and a set of monitors 39. In this illustrative embodiment, which is not to be taken by way of limitation, the set of monitors 39 include a time-of-day monitor 41 and a network monitor 43, although other environment-specific monitors may be used as well.

According to the invention, at least two versions (A1, A2, ...) of a given software application 45 to be deployed to the client machines is supported in an application catalog 47. Thus, as an example, version V1 may be a high performance, larger version of the application while version V2 may be a low performance, smaller version of the same application. Version V1 may have additional functional characteristics as compared to version V2. Different versions of the same application may have the same function set but different performance characteristics. Thus, for example, a Java application may be compiled in several different ways to create such multiple versions, with a given version being a higher performance version as compared to other version(s). In the latter case, the application versions differ but have equivalent functionality. As used herein, an application version may be a preexisting entity, or it may be generated "on-the-fly" from a set of application modules as will be seen.

Referring back to FIG. 2, the time-of-day monitor 41 provides information based on actual clock time or a configurable time referring to a particular work period (namely, a relative time-of-day). The network monitor 43 provides an interface for determining a current state of the network. Preferably, network monitor 43 continuously monitors the network input to and output from the server and, preferably, provides both point-in-time and periodic measurements of various metrics. The rules 37 are preferably defined by a system administrator or other user using the server GUI interface. Each application to be served generally has at least one rule associated therewith. In operation, the rules 37 are qualified or "resolved" against the user profiles 35 or the monitors 39, or both. In this manner, as will be seen, the rules are associated with the application catalog 47 to determine the appropriate version of the application to deliver according to the current time-of-day and/or network conditions as provided from the monitors. Rules may have associated priorities when multiple rules are applied to a given application.

The application catalog 47 provides selective access to the different versions of each application, as well as the set of criteria for selecting each version. An application set (consisting of all versions of an application) may contain any number of entries in the catalog.

Figure 3:
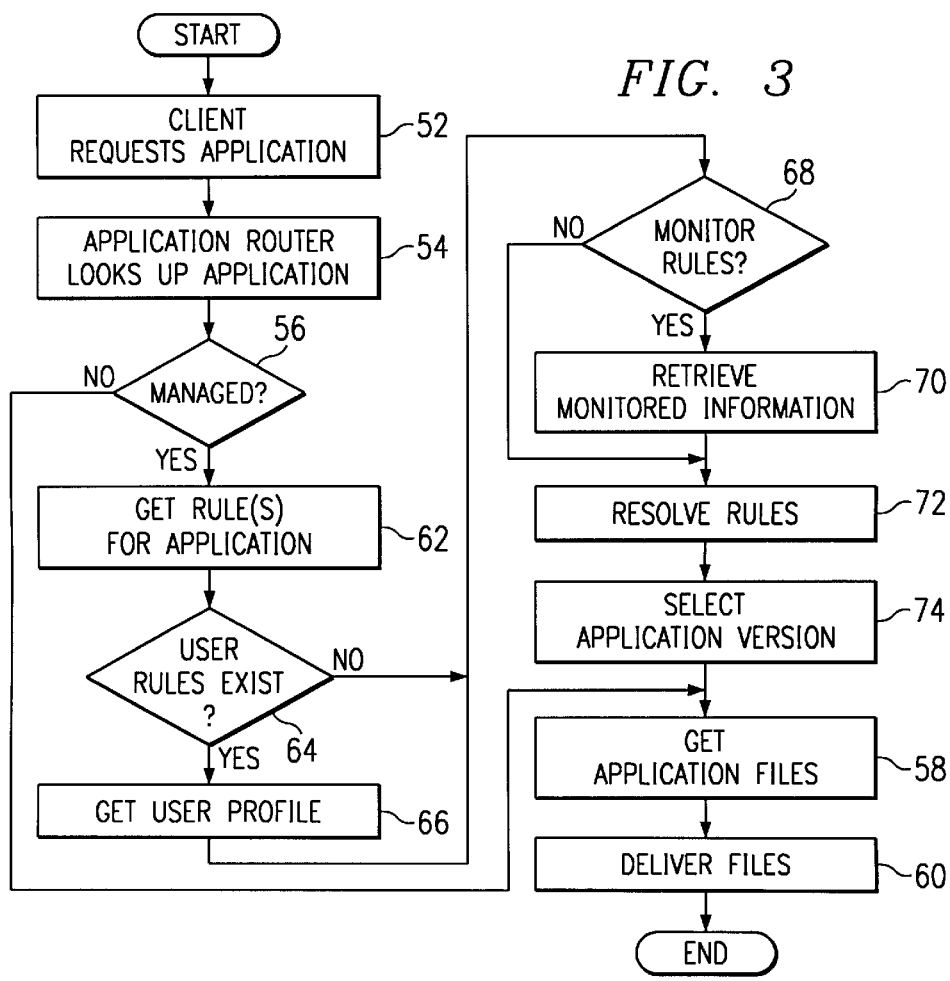
FIG. 3 is a flowchart of a preferred method for serving an application version in response to a user request.

FIG. 3 is a flowchart of a preferred operating routine of the application router 44 of the present invention. Router 44 is implemented preferably in software running on a processor of the server. The routine begins at step 52 when a given client machine requests an application to be served from the server. At step 54, the application router 44 receives the request and looks up the application in the application catalog 47. A test is then performed at step 56 to determine whether the application requested is being managed by the application catalog. If the outcome of the test at step 56 is negative, the routine branches to step 58 to obtain the set of one or more files that comprise the application. At step 60, the file set is served.

If the outcome of the test at step 56 is positive, which indicates that the application is being managed by the application catalog, the routine continues in step 62 to obtain the rules for the application. As noted above, preferably the rules criteria are defined by the system administrator. The rules are qualified against the user profiles, the monitors, or both. Thus, for example, at step 64, a test is performed to determine if any user-specific rules have been defined. If the outcome of the test at step 64 is positive, the routine continues at step 66 to obtain the user profile. The routine then continues at step 68, which is also reached by a negative outcome to the test at step 64. As an alternative, if no user profiles exist, a default profile may be retrieved (e.g., at step 66).

At step 68, the routine tests to determine whether there are any monitor rules. If the outcome of the test at step 68 is positive, the routine continues at step 70 to retrieve the monitor information. The routine then continues at step 72, which is also reached by a negative outcome of the test at step 68. At step 72, the rules are resolved. From this process, the routine determines which application version to serve in response to the client request. Thus, at step 74, the routine selects the application version that meets the specified rules criteria. The routine then obtains the necessary application files at step 58 and delivers these files at step 60. This completes the processing.

The rules provide an interface that are used by a system administrator (or some other permitted user) to establish a set of constraints under which different versions of the application are deployed. Typically, these constraints are set using a dialog panel available from an administrative GUI. Thus, for example, a given rule enforced by the rules process may be that certain users get certain versions of the application, or that certain users only certain versions of the application during a given time of day, or the like.

According to the present invention, user and network information are provided to the application router 44, together with the user-configurable rules. Given these inputs, the application router determines which of the application versions is to be deployed to client machines that request the application. In particular, when a user request for a given application is received at the server, the application router 44 selects an application version based on the then-existing network characteristics, and any input rules set by the rules process. This provides for robust, intelligent deployment of applications within the computer network, thus preserving bandwidth.

EXAMPLES

As noted above, the time-of-day monitor may provide information based on wall time (actual time of day) or by using a configurable service that provides a result that refers to a work period. For example, a system administrator could define a set of time periods that correspond to expected high, normal and low usage periods. FIG. 4 is an illustrative table resulting from such definition.

As noted above, the network monitor provides an interface for determining the current state of the network. Preferably, this module continuously monitors the network input to and output from the server. Examples of monitored information available include any one or more of the following:

current bandwidth utilization as a measure of traffic over a short period immediately preceding the call to the server;
  elapsed time for the transfer of a specified number of bytes;
  prediction of elapsed time to send a number of bytes based on recent transfers;
  network response time for packet delivery;
  effective transfer rate (bytes per specified time period);
  error occurrence rate (errors per specified time period); and
  network usage ratio to disk and CPU usage.

The above are merely illustrative. Moreover, the set of monitors may include other than time-of-day and network monitors. Generalizing, the monitor may include any process for monitoring a current state of a given variable, environment or the like depending on the environment in which the server is operating.

As noted above, rules are qualified against the monitors and/or user profiles to determine the appropriate version of the application to deliver according to the current conditions. Examples of representative rule syntax include, without limitation, the following:

User x always receives the high performance version of an application;
  Select low bandwidth version of an application when time period is high usage;
  Define high usage period on Monday as 8:15 am to 9:15 am;
  Define high bandwidth usage as x.x Mbps of traffic sustained for y minutes.

The above rules, of course, are merely exemplary.

An example of one application set in the application catalog is illustrated in the table of FIG. 5. As noted above, the rules criteria are matched against those defined by the system administrator to determine the appropriate version. In this example, three versions of the application are available: version (1) which is full function and totals 160 k in size, version (2) which is also full function, but is optimized for size instead of speed and totals 130 k in size, and version (3) which is a limited function version that totals 80 k in size.

This implementation example also assumes that priority is set by the order of the entries in the table. The first version is delivered when a high performance version is required, or when sufficient bandwidth is available (since the lower priority criteria will not be met). The second version is delivered when bandwidth availability is low, but the user is in the Finance department. The third version is sent when bandwidth availability is low.

According to the invention, a client that receives a lower priority version of an application (for example, an application version that has less than full functionality or less than full performance) may request additional code and/or functionality, as the case may be, after the initial download. The "enhanced" version (or the necessary components) thus may be served to the client when given conditions (that originally prevented the client from receiving the version) as established by the rules no longer exist or have been ameliorated to a given degree.

The present invention thus provides the server with the ability to selectively serve different versions of the same application in a dynamic manner. A given user may have associated therewith a group priority value that determines the user's priority for obtaining a given version of an application. This priority value may or may not be independent of various system or other constraints, such as time of day, network utilization, a number of permitted users, and the like. If the user requesting the application is from a high priority group, he or she is served the high performance, larger version of the program while other users would get the smaller, lower performance version. This user priority may be further tuned by the network monitor as has been described. Thus, for example, if network utilization is at a certain point or higher (at the time of the request), the application router may deploy the high performance, larger version of the program, but then only to the highest priority users. In addition, a given user profile may be associated with a given application.

The server thus supports multiple versions of its applications, with each version tuned for differing criteria. A small size version could be selected during times of high network usage to minimize congestion, whereas a high performance, though larger, version may be selected during lower traffic conditions. The server may dynamically create the applications to download, selecting modules for the application based on sets of criteria defined by the server administrator to reflect the user needs and current network environment. When a given user receives a lower performance (or lower function) version, the inventive routine may selectively serve a higher performance (or higher function) version as the monitored conditions (namely, time-of-day, network characteristics, etc.) change.

The one or more processes that comprise the network monitor may be known routines used to monitor various network characteristics. Some of these functions exist in known network operating systems and others are provided in standalone programs. Thus, for example, known NOS programs often have the capability to collect network usage statistics and other such information.

Although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

The present invention has been described in the context of a computer environment wherein a controlled set of users issues requests for a controlled set of applications. The invention, however, is not limited to such environment. As used herein, the term "server" should be broadly construed to mean a computer, computer platform, an adjunct to a computer or platform, or any component thereof. A given server that supports the inventive functionality may be a file server, a Web server, or the like. Of course, a "client" should be broadly construed to mean one who requests or gets the file (with the "server" being the entity which downloads the file). A given client machine may be connected to the server over any type of computer network including, without limitation, the Internet, an intranet, a local area network, a wide area network, or the like.

Having thus described our invention, what we claim as new and desire to secure by Letters Patent is set forth in the following claims:

What is claimed is:

1. A method for deploying an application to client computers across a computer network, comprising the steps of:
    establishing at least one rule for determining which of a given set of application versions are to be served to a client computer;
    monitoring given conditions; and
    in response to a request from a client computer to serve the application, resolving the rule against the monitored conditions to select the application version to serve to the client computer.

2. The method as described in claim 1 further including the step of:
    serving the application version to the client computer.

3. The method as described in claim 2 further including the step of:
    later serving another application version as the monitored conditions change.

4. The method as described in claim 1 wherein the monitored conditions include an actual time-of-day.

5. The method as described in claim 1 wherein the monitored conditions include a relative time-of-day.

6. The method as described in claim 1 wherein the monitored conditions include a network characteristic.

7. The method as described in claim 6 wherein the network characteristic is selected from the group consisting essentially of current bandwidth utilization over a given period of time, elapsed time for transfer of a given number of bytes, a prediction of elapsed time to send a given number of bytes based on historical data, network response time for packet delivery, effective transfer rate, event occurrence rate, and network usage ratio to disk and CPU usage.

8. The method as described in claim 1 further including the step of:
    resolving the rule against a given user profile.

9. A method for deploying an application to client computers across a computer network as given conditions are being monitored, comprising the steps of:
    establishing at least one rule for determining which of a given set of application versions are to be served to a client computer;
    establishing at least one user profile for determining which of a given set of users have a given priority;
    in response to a request from a client computer to serve the application, resolving the rule against the monitored conditions and the user profile to select a first application version to serve to the client computer; and
    serving the first application version to the client computer.

10. The method as described in claim 9 further including the step of:
    later serving a second application version as the monitored conditions change.

11. The method as described in claim 10 wherein the second application version has a higher performance metric than the first application version.

12. The method as described in claim 10 wherein the second application version has a larger function set as compared to the first application version.

13. The method as described in claim 9 wherein the monitored conditions include an actual time-of-day.

14. The method as described in claim 9 wherein the monitored conditions include a relative time-of-day.

15. The method as described in claim 9 wherein the monitored conditions include a network characteristic.

16. The method as described in claim 15 wherein the network characteristic is selected from the group consisting essentially of current bandwidth utilization over a given period of time, elapsed time for transfer of a given number of bytes, a prediction of elapsed time to send a given number of bytes based on historical data, network response time for packet delivery, effective transfer rate, event occurrence rate, and network usage ratio to disk and CPU usage.

17. A method for deploying applications to client computers across a computer network as given conditions are being monitored, comprising the steps of:
    for each managed application, maintaining a set of application versions;
    establishing at least one rule for determining which of a given set of application versions are to be served to a client computer;
    establishing at least one user profile for determining which of a given set of users have a given priority;
    in response to a request from a client computer to serve an application, determining whether the application is a managed application;
    if the application is a managed application, resolving the rule against the monitored conditions and the user profile to select an application version of the managed application to serve to the client computer; and
    serving the selected application version to the client computer.

18. The method as described in claim 17 wherein the given set of application versions includes at least a first version and a second version.

19. The method as described in claim 18 wherein the first version has a higher performance metric than the second version.

20. The method as described in claim 18 wherein the first version has a larger function set as compared to the second version.

21. A computer program product in a computer-readable medium for use in deploying an application to client computers across a computer network, comprising:

means for establishing at least one rule for determining which of a given set of application versions are to be served to a client computer;

means for establishing at least one user profile for determining which of a given set of users have a given priority;

means for monitoring given conditions; and means responsive to a request from a client computer to serve the application for resolving the rule against the monitored conditions and the user profile to select an application version to serve to the client computer.

22. The computer program product as described in claim 21 wherein the means for monitoring includes a time-of-day monitor.

23. The computer program product as described in claim 21 wherein the means for monitoring includes a network usage monitor.

24. A computer, comprising:

a processor;

a network operating system having means for monitoring given network conditions;

an application to be deployed to client computers across a computer network to which the computer is connected; and an application router for use by the network operating system for use in deploying the application, comprising:

means for establishing at least one rule for determining which of a given set of application versions are to be served to a client computer;

means for establishing at least one user profile for determining which of a given set of users have a given priority; and means responsive to a request from a client computer to serve the application for resolving the rule against the network conditions and the user profile to select an application version to serve to the client computer.

25. A method for deploying selected versions of an application to client computers across a computer network, comprising the steps of:

monitoring a given network characteristic;

in response to a request to serve the application to a client computer, selecting a version of the application based on the monitored network characteristic, wherein the version includes a subset of a full set of functions available in the application; and serving the selected version of the application to the client computer.

26. A method for deploying selected versions of an application to client computers across a computer network, comprising the steps of:

monitoring a given network characteristic;

in response to a request to serve the application to a client computer, selecting a version of the application based on the monitored network characteristic, wherein a performance characteristic of the selected version is less than a performance characteristic of at least one other version of the application; and serving the selected version of the application to the client computer.

* * * * *